United States Patent Office 3,445,408
Patented May 20, 1969

3,445,408
POLYAMIDE RESINS
Tibor Gabris, Paris, France, assignor to Liaison S.A., Geneva, Switzerland
No Drawing. Filed Sept. 6, 1966, Ser. No. 577,187
Int. Cl. C08g 20/36, 20/20, 20/38
U.S. Cl. 260—18                                10 Claims

ABSTRACT OF THE DISCLOSURE

Polymerized fatty acids and polyamines are copolymerized with a sulfur material to produce polyamides containing chemically bound sulfur. The resultant polyamides have heat stability, adhesion, elasticity and in some cases color retention that are considerably improved over the like properties of corresponding polyamides made without the sulfur material. This material may be, in general, an organic compound containing divalent sulfur, such as a thioacid, a thioalcohol, an aminoacid containing divalent sulfur, and elemental sulfur.

---

This invention relates to polyamide resins.

It is known that polyamide resins can be prepared from simple diamines and/or homologues thereof (for example ethylene diamine, 1,4-butylene diamine or the like) and addition polymers of polyene fatty acids or esters of these acids. Various methods have been proposed for obtaining these polyamide resins, one particularly common method involving forming the polyamide from polymerized unsaturated fatty acids or fatty acid esters in which most of the polymer consists of dimer, i.e. is a dicarboxylic acid. There is frequently also present in such polymer compositions a proportion of trimer or higher oligomer and some residual monomer. Examples of such formulations of polyamides are described in U.S. Patents Nos. 2,379,413, 2,450,940 and 2,555,111.

The reaction of the polymeric acids or esters thereof with the amine may be carried out at temperatures between 200° C. and about 300° C. In the case of free polymeric acids, water is formed as a by-product of the condensation reaction while in the case of polymeric acid esters, the corresponding alcohol is produced. The water or alcohol is removed by distillation. To facilitate the removal of these by-products, the reaction can be carried out under reduced pressure or a solvent can be applied as a carrier.

In experimenting with these polyamides formed from polymerized polyene fatty acids and/or esters thereof it was observed that continuing heating at high temperatures, especially in the presence of air, tended to bring about gelling, skin formation, severe darkening and increase of melting point and viscosity. In the preparation of some of these resins, gelling took place even during the preparation. Most of these phenomena are troublesome both in the manufacture of the polyamide resins and for many of their uses e.g. in hot melt adhesives and coatings, modifications of other resin like materials, plastisols in which the polyamides function as high molecular weight plasticizers, etc.

It has been proposed heretofore to take certain steps to improve the heat stability of polyamides. Most of these are based on the fundamentals of chemistry involved in preparing condensation products of polyunsaturated compounds. Some of these steps have been studied.

It has been expected and confirmed that heating the reactants under an inert atmosphere improves the color and heat stability of the finished polyamide resin. It has been confirmed that the more complete the reaction, the more stable is the resulting resin. It has likewise been found that small amounts of polymerization "chain stoppers" like mono-carboxylic acids, e.g. oleic acid, improve stability during manufacture and in the finished resin, and minimize viscosity increase promoted by prolonged heating.

In a series of experiments, the value of antioxidants has been tested. As some of the polyamides are used in contact with food products, and also because of the discoloring nature of aromatic amine type antioxidants, only phenolic types have been evaluated. It has been concluded that certain hindered phenols impart heat stability to polyamide resins. Stabilizers like triphenyl phosphite proved to be beneficial but the strong odor of these compounds rules them out as a suitable approach to heat stabilization.

It has now been found that by copolymerizing the acids and polyamines with sulphur or a sulphur-bearing organic compound, preferably of the bifunctional class, e.g. thiomalic acid, thiodipropionic acid, thiodiethanol, thioglycolic acid, etc., sulphur-containing polyamide resins having unexpectedly advantageous properties can be obtained. Through the copolymerization of these organic sulphur compounds, the polyamide resins not only gain in heat stability but also display improved elasticity and adhesion to metal.

It has been found that in addition to the aforementioned features, the copolymerization of some organic sulphur compounds also improves color stability. Some of the effects and final characteristics resulting from such copolymerization could be duplicated by dispersing elementary sulphur in the reaction mixture thus completing the condensation reaction in the presence of small quantities of sulphur. The actual way in which the elementary sulphur reacts is not completely understood. It is surmized that the elemental sulphur inserts into some of the paraffinic C—H bonds of the unsaturated fatty acid radicals yielding episulphides, vinylic and alkenyl type mercaptans, etc.

By the method according to the present invention, many or all the extra steps and precautions can be eliminated and by one single step, heat stability, adhesion, elasticity and in some cases color and color retention of the polyamide resins can be very significantly improved.

It has been known for some time that some of the sulphur bearing organic compounds can be used as additives to stabilize organic polymers, but in the form of additives their stabilizing effect is fugitive as they can be extracted from the polymers or can be eliminated by other means. Also, as such additives are not chemically bound they can migrate from the polymer into material in contact therewith.

It has been also found that most of these sulphur-modified polyamide resins when melted and drawn into filaments, form a body of elastic behavior and of considerably higher elongation at break than their counterpart made without the help of organic or elemental sulphur.

The invention will now be further described with reference to the following specific examples. For the purposes of comparison with the products according to the invention, control resins A, D, F and G were prepared without the use of sulphur or sulphur-bearing compounds; the production and properties of these control resins are summarized in the following table:

|  | Resin | | | |
| --- | --- | --- | --- | --- |
|  | A | D | F | G |
| Components (parts): | | | | |
|   Polymerized fatty acids [1] | 1,182 | 1,158 | 926.4 | 764.5 |
|   Oleic acid | | 23.7 | 23.7 | 23.7 |
|   Azelaic acid | | | 75.6 | 128.5 |
|   Ethylene diamine (98%) | 122.6 | 122.6 | 122.6 | 122.6 |
|   Antioxidant-stabilizer [2] | | 12.6 | 9.3 | 12.6 |
| Reaction Conditions: | | | | |
|   Reaction completed at ° C | 206 | 250 | 250 | 250 |
|   Run under nitrogen blanket | no | yes | yes | yes |
|   Water of reaction removed by distillation (parts) | 73 | 72 | 73 | 72 |
| Characteristics: | | | | |
|   Melting point, ° C | 103 | 104 | 144 | 185 |
|   Acid number | 6.7 | 4.5 | 6.5 | 6.9 |
|   Amine number | 6.5 | 5.0 | 5.4 | 5.7 |
|   Nitrogen (by Kjeldahl), percent | 4.47 | 4.14 | | |
|   Viscosity, poise: | | | | |
|     At 150° C | 52 | 58 | | |
|     At 200° C | | | | 50 |
|   After heating 24 hrs. in oven kept at 150° C.; taken at 150° C | 170 | 98 | | |
|   After heating 24 hrs. in oven kept at 200° C.; taken in 200° C | | | | 80 |
| Skin formation during oven test | severe | ([3]) | | ([3]) |
| Color after oven test | dark | ([4]) | | ([4]) |

[1] Dibasic acid from polymerization of naturally occurring C₁₈ unsaturated acids with following composition:
  Dimer content ———————————————— 75%
  Trimer content ———————————————— 22%
  Monomer content ——————————————— 3%
[2] A hindered phenol stabilizer.
[3] Very slight.
[4] Similar to orig.

EXAMPLE I (RESIN H)

1,100 grams of polymerized fatty acids (of the same composition and manufacture as used in the preparation of the control samples) and 26.6 grams of thioglycolic acid were mixed by stirring at room temperature in an electrically heated glass resin reaction kettle equipped with a suitable stirrer, condenser connected through a graduated distilling trap and cover with inlets for a thermometer, an addition funnel and an inlet for introducing nitrogen. While stirring, the acid mixture was deoxygenated with the help of nitrogen and a blanketing stream of nitrogen was thereafter used throughout the reaction. While stirring, at room temperature, 122.6 grams of 98 percent ethylene diamine were added dropwise to the acid mixture.

Evolution of heat occurred due to the acid/amine salt formation. The last drop of ethylene diamine was added by the end of 30 minutes and by that time, the temperature of the reaction mixture had risen to 70° C. Within the next 30 minutes, the reaction kettle was heated so that a temperature of 140° C. was reached in the reaction mixture. At this point, the first two grams of distillate were collected in the trap.

A titration of the distillate confirmed that no amine escaped from the resin kettle. The temperature then was raised in 90 minutes to 250° C. by which time a total of 70 grams of water were collected in the trap.

For an additional 15 minutes, the temperature of 250° C. was maintained. As no more distillation took place and the amount of water collected in the trap was close to the theoretical quantity of water of condensation reaction, the reaction was considered to be complete.

This resin had originally a somewhat darker color than its counterpart Resin A; during a 24 hour heat test at 150° C., the color did not change at all. It was also observed that the sulphur-modification resulted in a considerable improvement in the metal adhesion and elasticity of filaments made by melting the resin. The characteristics of resin H are as follows:

| | |
| --- | --- |
| Melting point, ° C. | 100 |
| Acid number | 13 |
| Skin formation during oven test (24 hours, 200° C.) | <Resin A |

EXAMPLE II (RESIN J)

Exactly the same equipment and same manufacturing lot of polymerized fatty acids and ethylene diamine were used as in Example I.

830 grams of polymerized fatty acids, 94 grams of azelaic acid and 37.8 grams of dithiodibenzoic acid were charged to the resin reactor and vigorously stirred under nitrogen and heated in two hours to 100° C. By the end of said period, the acids formed a homogeneous mixture. At this temperature and maintaining a flow of nitrogen throughout the whole reaction, in 15 minutes, 122 grams of ethylene diamine were added dropwise. The salt formation made the temperature of the reaction mixture to rise to 135° C. Soon after this, it was observed that some gas of typical odor, most probably hydrogen sulphide, left the condenser.

For 15 minutes, the temperature was reduced to 125° C. During this 15 minutes, 16 grams of distillate were collected in the trap. The temperature was then raised in five minutes to 140° C. resulting in a total distillate of 42 grams. The temperature was then slowly raised over a period of 2 hours to 212° C. Maintaining this temperature for some 15 minutes, distillation seemed to cease leaving in the trap a total of 64 grams of distillate which proved to be water.

The reaction product was a transparent brown, hard, brittle but somewhat elastic resin with a melting point close to 150° C. and with a heat stability superior to that of control resin F. While the color of resin F was lighter than that of this resin, a heat treatment of 24 hours in an oven at 200° C. caused considerable color change in resin F, while a 24 hour heat treatment in an oven at 250° C. did not change the color of resin J at all. The viscosity stability of resin J was extraordinary. Some of the characteristics of resin J are listed below:

| | |
| --- | --- |
| Acid number | 3 |
| Amine number | 4 |
| Nitrogen by Kjeldahl, percent | 5.43 |
| Melting point, ° C. | 150 |
| Viscosity— | |
|   At 200° C., poise original | 15 |
|   After 24 hours in 250° C. oven | 15 |

EXAMPLE III (RESIN K)

The same equipment and raw materials as in Examples I and II were used in this laboratory run with the exception that instead of a sulphur-bearing acid, the effect of a thioalcohol was studied. A part of the ethylene diamine was replaced with the stoichiometric quantity of thiodiethanol.

900 grams of polymerized fatty acids, 94 grams of azelaic acid and 50 grams of thiodiethanol were heated in the reaction kettle under nitrogen for 2 hours to reach 100° C. In 15 minutes, 100 grams of ethylene diamine were added dropwise which, due to heat of reaction, brought up the temperature of the reaction mixture to 130° C. Similarly to the previous examples, heating was continued stepwise to raise the temperature. Finally, the reaction was finished in 3 hours at 250° C. by which time a total of 68 grams of distillate were collected in the trap.

The finished resin was lighter colored than its counterpart resin F and had a remarkable heat stability both with respect to color and viscosity. During the heat test the color of the resin did not change at all.

It is also interesting to remark that the viscosity of resins made with thiodiethanol was considerably lower than any of the polyamide resins of the same melting range. This can be seen from the following characteristics:

| | |
| --- | --- |
| Acid number | 2.1 |
| Amine number | 0 |
| Melting point ° C. | 140 |
| Nitrogen by Kjeldahl percent | 4.15 |

Viscosity, poise—
    At 200° C. _____ 2
    At 200° C. after 24 hours in 200° C. oven ____ 5

EXAMPLE IV (RESIN L)

This example illustrates the stabilizing effect of an organic sulphur compound as used in the preparation and polymerized into polyamides which are difficult to make as they gell during the preparation.

In the same equipment and by the same procedure as in the previous examples, 840 grams of polymerized fatty acids and 84 grams of oleic acid (both from the same manufacturing lot as used in the other examples) were mixed and heated to 100° C. 126 grams of 98 percent diethylene triamine were added dropwise in 15 minutes which made the temperature raise to 130° C. approximately. Temperature was gradually raised and at 150° C. some 30 grams of water were collected in the trap. Upon forcing the reaction by increasing the temperature close to 180° C., a total of 40 grams of water were collected in the trap. Suddenly, the reaction mixture gelled up and turned into a rubberlike infusible mass. The product was insoluble in a 50/50 toluene/isopropanol mixture commonly used for dissolving polyamide resins.

In a second experiment the same procedure was repeated by charging 840 grams of polymerized fatty acids, 84 grams of oleic acid and 25 grams of 2,2'-thiodiethanol to the resin kettle. After heating to 100° C., 105 grams of 98 percent diethylene triamine were added dropwise. The heat of reaction raised the temperature to 128° C. Within an hour, the mixture was heated to 150° C. by which time 30 grams of water were received in the trap. During the next hour, temperature was raised to 185° C. without observing any significant thickening or gelling. The total of water collected in the trap at this point was 44 grams. The temperature was then raised to 203° C. and maintained for 10 minutes giving a total distillate of 46 grams. The resin was discharged from the reactor with no difficulty. At room temperature the resin was a very viscous and tacky light amber colored product melting in the range of 55° C. to 60° C. Viscosity and other properties of the resin were as follows:

Viscosity, poise—
    At 150° C. _____ 10.5
    At 200° C. _____ 4.5
Acid number _____ 45
Amine number _____ 33

To verify that the thiodiethanol was polymerized into the polyamide resin, the following tests were performed. 37.5 grams of the finished resin were refluxed for 3 hours with 100 milliliters of ethanol. After cooling to room temperature, the liquid phase was decanted. Said phase showed some slight white cloudiness which was impossible to separate by filtration or centrifuging. The ethanol was then distilled off leaving behind 600 milligrams of a brown very viscous liquid which was soluble in ethylether but insoluble in water. Since thiodiethanol is very soluble in water, it was concluded that the mentioned residue could have been some low molecular weight fraction of the resin and that the thiodiethanol was completely polymerized into the resin.

EXAMPLE V (RESINS M AND N)

In these experiments the effect of copolymerizing $\beta,\beta$-thiodipropionic acid were studied in a Resin A and Resin D type polyamide respectively. Equipment, raw materials and procedures of preparation were the same as described in previous examples. The reactions were finished at 250° C. The polymerized fatty acids were mixed with the thiodipropionic acid and heated to 95° C. to 100° C. While stirring, the proper quantity of ethylene diamine was added and the reaction mixture was heated slowly to reach 250° C. at which temperature no more water could be removed from the reaction mixture. Quantities of reactants used in these experiments and the properties of the finished resins are shown in the following tabulation.

|  | Resin M | Resin N |
|---|---|---|
| Proportions of Reactants: |  |  |
| Polymerized fatty acids, grams | 1,055 | 1,140 |
| Thiodipropionic acid, grams | 40 | 13 |
| Ethylene diamine, grams | 122.6 | 122.6 |
| Properties of Resins: |  |  |
| Melting point, ° C | 110 | 108 |
| Melting point, ° C after 24 hours in 150°C oven | 110 |  |
| Acid number | 11 | 1 |
| Amine number | 0 | 0 |
| Viscosity, poise: |  |  |
| At 150° C | 150 | 26 |
| At 150° C. after 24 hours in 150° C. oven | 180 | 130 |
| Color, original | (1) | (2) |
| Color after 24 hours in 150° C. oven | (1) | (3) |

[1] Excellent. [2] Light amber. [3] Amber.

From the above data it was concluded that thiodipropionic acid has a very good heat stabilizing effect if copolymerized with polyamides. It seems, from the above cited examples, that for taking full advantage of this combination a minimum of one and a half percent by weight must be copolymerized with the polymeric fatty acids and polyamines.

EXAMPLE VI (RESINS P AND R)

In these experiments resins similar to Resin F and Resin G were made by copolymerizing thiodipropionic acid into the polyamide. As the amount of azelaic acid used for making these resins was between that used for resins F and G, it was expected that the melting point of the resulting polyamide would be between 144° C. and 185° C.

All the equipment, manufacturing lots of materials used and methods of operation were identical with those of Example V. Proportions of materials for making these resins and the properties of the finished polyamides are shown in the following tabulation:

|  | Resin P | Resin R |
|---|---|---|
| Proportion of Reactants: |  |  |
| Polymerized fatty acids, grams | 830 | 773 |
| Thiodipropionic acid | 22 | 40 |
| Azelaic acid | 94 | 94 |
| Ethylene diamine | 122.6 | 122.6 |
| Properties of Resins: |  |  |
| Melting point, ° C.: |  |  |
| Original | 160 | 160 |
| After 24 hours in 200 ° C. oven | 160 |  |
| Acid number | 12 | 12 |
| Amine number | 0.4 | 1.2 |
| Viscosity at 200° C., poise: |  |  |
| Original | 70 | 36 |
| After 24 hours. in 200° C. oven | 70 | 40 |
| After 36 hrs. in 200 °C. oven |  | 36 |
| Color, original | (1) | (1) |
| Color after 24 hour heat test at 200° C | (2) | (2) |

[1] Very light yellow.
[2] Both resins seemed to be even clearer and lighter than before heat test.

EXAMPLE VII (RESIN S)

In this preparation, the effect of elemental sulphur was tested. Exactly the same proportions of polymerized fatty acids and ethylene diamine were used and same reaction conditions applied as in the preparation of Resin A. Based on the amounts of the polymerized fatty acids, 3% of powdered sulphur were added to the reaction mixture before heating up the glass reactor.

The finished resin was a transparent brownish resin with a melting point of 98° C. The viscosity of the resin was quite stable: at 200° C., the viscosity was 4 poise and after a heat test of 24 hours at 200° C., the viscosity was 8 poise. The resulting resin displayed high adhesiveness and formed an elastic thread.

While the invention has been described above with reference to examples employing ethylene diamine as the polyamine component, it will be understood that homologs of this compound and/or other diprimary or monoprimary monosecondary amines may equally well be used. Similarly other monofunctional compounds than monocarboxylic acids can be used as chain stoppers, e.g., monoprimary or monosecondary amines such as fatty amines and aniline, and of the carboxylic acids linoleic and/or linolenic acid (which are monomers occurring in commercial grades of polymerized fatty acids) may be employed in addition to or instead of the oleic acid mentioned above. It has also proved beneficial to include in the reaction mixture one or more amino-acids; the amino-acid may contain sulphur, e.g., p-aminophenylmercaptoacetic acid.

From the above it can be seen that the sulfur material can be used in amounts as low as about 1% (Example 5, Resin N) and in amounts as high as about 5% (Example 3, Resin K). The other examples show intermediate amounts of sulfur material being used, the percentages involved being about 2.2% for Example 1, about 4% for Example 2, about 2.6% for Example 4, about 3.4% for Resin M in Example 5, about 2.3% for Resin P in Example 6, about 4.4% for Resin R in Example 6, and 3% for Example 7. A variety of sulfur materials are disclosed which are selected from the group consisting of thioacids, thioalcohols and elemental sulfur. The percent calculations are based on the combined weight of the polymeric fatty acids used and the weight of the particular polyamine used.

The polymerized fatty acids or esters and the amines may be chosen from those disclosed in the above identified patents. The amines may be diprimary amines or monoprimary monosecondary amines. The polymerized fatty acids that are preferred are those consisting chiefly of the dimer. The monofunctional organic compounds that act as chain stoppers may be monocarboxylic acids or monoprimary or monosecondary amines. Further, as disclosed in my copending application Ser. No. 577,198, the principles of this invention may be applied to polyamides prepared using oxidized polyolefines, such as oxidized polyethylene which is reacted with a polyamine, such as ethylene diamine. In using oxidized polyolefines one may also include in the reaction mixture the polymerized fatty acids or esters and the chain stoppers as described above.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:
1. A polyamide product of the copolymerization of a mixture comprising a polymerized fatty acid material, a polyamine and a sulfur material which is selected from the group consisting of thioacids, thioalcohols and elemental sulfur, said sulfur material being present in amounts up to about 5% by weight based on the combined weight of said fatty acid material and said polyamine.

2. A polyamide in accordance with claim 1 in which said sulfur material is a thioacid.

3. A polyamide in accordance with claim 1 in which said sulfur material is a thioalcohol.

4. A polyamide in accordance with claim 1 in which said sulfur material is elemental sulfur.

5. A polyamide in accordance with claim 4 in which the amount of sulfur is 3% on said basis.

6. A polyamide in accordance with claim 1 which is a product also of a monofunctional organic compound contained in said mixture as a chain stopping agent.

7. A polyamide in accordance with claim 1 in which said sulfur material is selected from the group consisting of thiomalic acid, thiodipropionic acid, thioglycolic acid, dithiodibenzoic acid, thiodiethanol, thiodipropionic acid, p-aminophenylmercaptoacetic acid and sulfur.

8. A process for producing a polyamide containing chemically combined sulfur which comprises forming a polymerization mixture comprising a polymerized fatty acid material, a polyamine and a sulfur material which is selected from the group consisting of thioacids, thioalcohols and elemental sulfur, said sulfur material being present in amounts up to about 5% by weight based on the combined weight of said fatty acid material and said polyamine; and heating the said mixture under conditions effecting the removal of volatile condensation products.

9. A process in accordance with claim 8 in which said sulfur material is elemental sulfur.

10. A process in accordance with claim 8 in which said sulfur material is present in amounts of at least 1.5% on said basis.

References Cited

UNITED STATES PATENTS

| | | | |
|---|---|---|---|
| 3,280,052 | 10/1966 | Watanabe et al. | 260—18 |
| 3,203,934 | 8/1965 | Wellens et al. | 260—78 |
| 2,598,407 | 5/1952 | Marvel | 260—402.5 |
| 2,396,957 | 3/1946 | Lazier et al. | 260—78 |
| 2,388,676 | 11/1945 | Coffman et al. | 260—78 XR |
| 2,304,369 | 12/1942 | Morgan et al. | 260—402.5 X |
| 2,191,556 | 2/1940 | Carothers | 260—78 |

DONALD E. CZAJA, *Primary Examiner.*

C. WARREN IVY, *Assistant Examiner.*

U.S. Cl. X.R.

260—45.95, 78, 402.5